United States Patent
Webster

(10) Patent No.: US 9,290,825 B2
(45) Date of Patent: Mar. 22, 2016

(54) METHOD AND AN APPARATUS FOR PRESTRESSING COMPONENTS BY ELECTRICAL DISCHARGE

(75) Inventor: John R. Webster, Derby (GB)

(73) Assignee: ROLLS-ROYCE plc, London (GB)

( * ) Notice: Subject to any disclaimer, the term of this patent is extended or adjusted under 35 U.S.C. 154(b) by 948 days.

(21) Appl. No.: 13/505,626

(22) PCT Filed: Oct. 6, 2010

(86) PCT No.: PCT/EP2010/064893
§ 371 (c)(1),
(2), (4) Date: May 2, 2012

(87) PCT Pub. No.: WO2011/061001
PCT Pub. Date: May 26, 2011

(65) Prior Publication Data
US 2012/0216587 A1 Aug. 30, 2012

(30) Foreign Application Priority Data
Nov. 17, 2009 (GB) .................................. 0920009.8

(51) Int. Cl.
*C21D 10/00* (2006.01)
*C21D 7/06* (2006.01)
(Continued)

(52) U.S. Cl.
CPC ............ *C21D 10/00* (2013.01); *B23K 26/0069* (2013.01); *B23K 26/0734* (2013.01); *C21D 7/06* (2013.01); *C22F 3/00* (2013.01); *B23K 2201/001* (2013.01)

(58) Field of Classification Search
CPC ........ C21D 7/00; C21D 7/13; C21D 2201/00; C21D 2201/01; C21D 7/02; C21D 10/00; C21D 7/06; B01J 3/08; B01J 19/121; B01J 19/08; B01J 19/125; B01J 19/126; B23K 26/0734; B23K 26/0069; B23K 2201/001; C22F 3/00
USPC .................... 72/54, 56; 29/889, 889.1, 889.7; 416/241 R; 148/565, 566; 204/157.22, 204/157.41, 157.61, 157.44, 157.63, 157.43
See application file for complete search history.

(56) References Cited

U.S. PATENT DOCUMENTS 3,087,840 A * 4/1963 Shaw ............................. 366/108
3,852,985 A * 12/1974 Haeusler et al. .................. 72/56
(Continued)

FOREIGN PATENT DOCUMENTS

| EP | 1 191 112 A1 | 3/2002 |
|---|---|---|
| WO | WO 2008/037948 A1 | 4/2008 |
| WO | WO 2008/037949 A1 * | 4/2008 |

OTHER PUBLICATIONS

Written Opinion of the International Searching Authority issued in Application No. PCT/EP2010/064893; Dated Mar. 9, 2011.
(Continued)

*Primary Examiner* — David Bryant
*Assistant Examiner* — Lawrence Averick
(74) *Attorney, Agent, or Firm* — Oliff PLC

(57) ABSTRACT

An apparatus for pre-stressing a component, the apparatus includes means to direct a beam of radiation in a path through a medium adjacent to the component between a pair of electrodes to produce ionisation in the path through the medium and means to produce an electrical discharge between the pair of electrodes in the path through the medium to produce a pressure pulse in the medium adjacent to the component without the electrical discharge directly contacting the component, the pressure pulse impacting a surface of the component to produce a region of compressive residual stress within the component.

32 Claims, 8 Drawing Sheets

(51) Int. Cl.
*C22F 3/00* (2006.01)
*B23K 26/00* (2014.01)
*B23K 26/073* (2006.01)

(56) References Cited

U.S. PATENT DOCUMENTS

| | | | |
|---|---|---|---|
| 4,324,624 A * | 4/1982 | Diller | 205/340 |
| 5,496,983 A | 3/1996 | Hoshi | |
| 5,911,891 A * | 6/1999 | Dulaney et al. | 219/121.85 |
| 6,078,022 A * | 6/2000 | Dulaney et al. | 219/121.85 |
| 6,483,076 B1 * | 11/2002 | O'Loughlin et al. | 219/121.85 |
| 6,644,080 B2 * | 11/2003 | Lindstrom | 72/19.4 |
| 7,723,643 B2 * | 5/2010 | Hackel et al. | 219/121.85 |
| 2005/0158460 A1 * | 7/2005 | Williams | 427/140 |
| 2008/0078477 A1 * | 4/2008 | Bailey et al. | 148/421 |
| 2010/0008786 A1 * | 1/2010 | Timoshkin et al. | 416/223 R |
| 2010/0055490 A1 * | 3/2010 | Sugihashi et al. | 428/596 |

OTHER PUBLICATIONS

International Search Report issued in Application No. PCT/EP2010/064893; Dated Mar. 9, 2011.

* cited by examiner

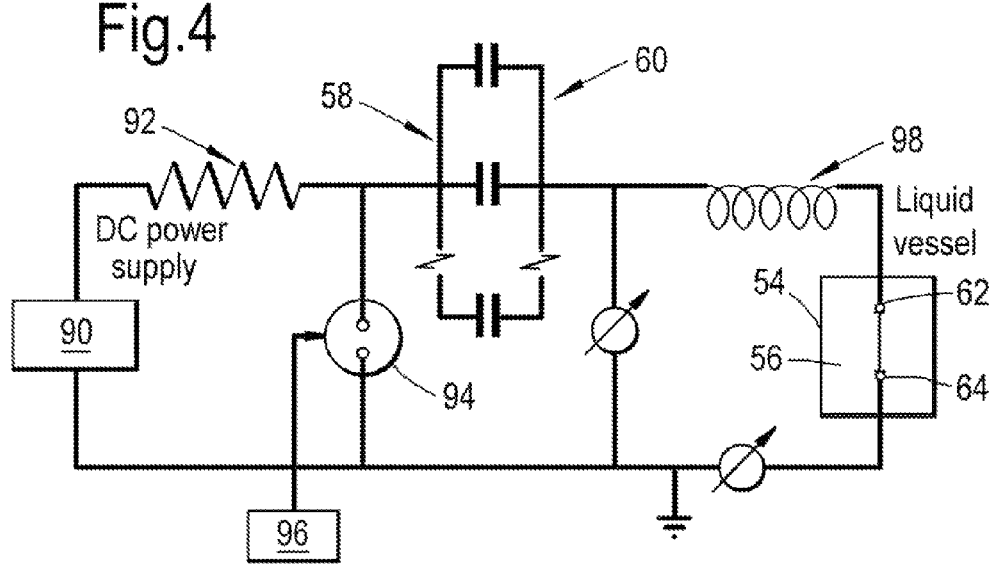
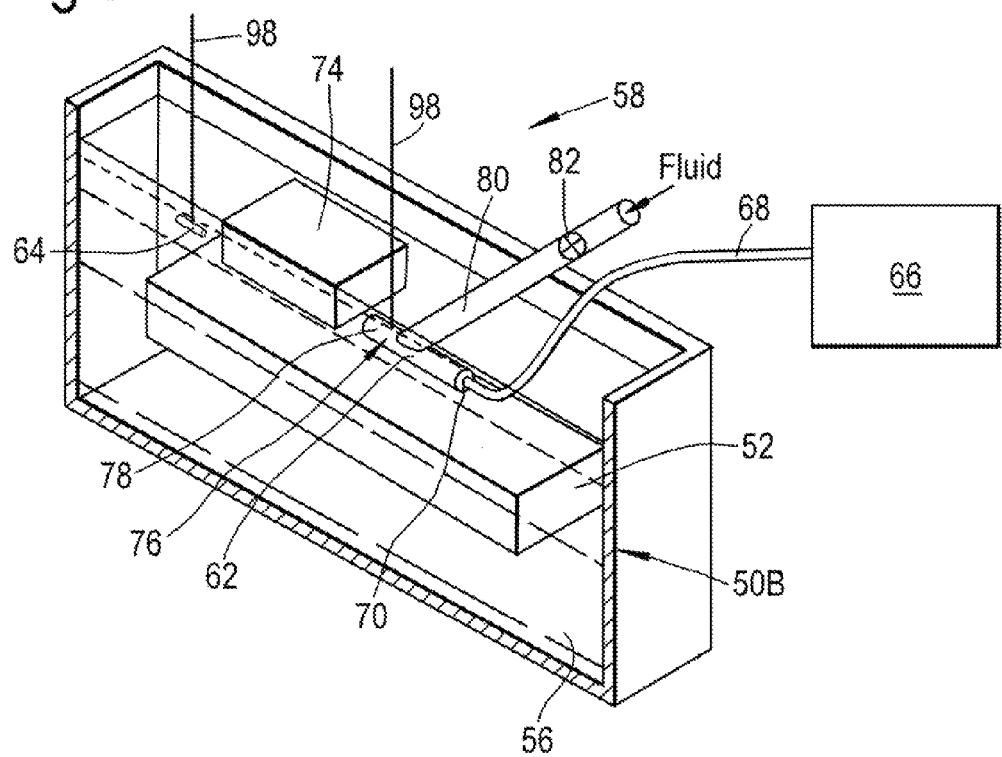

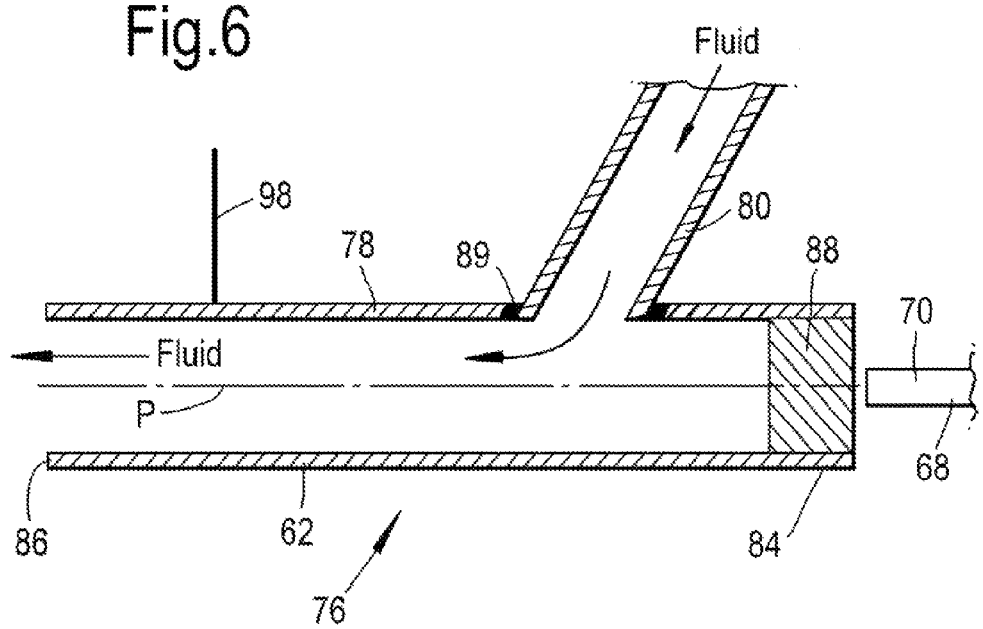
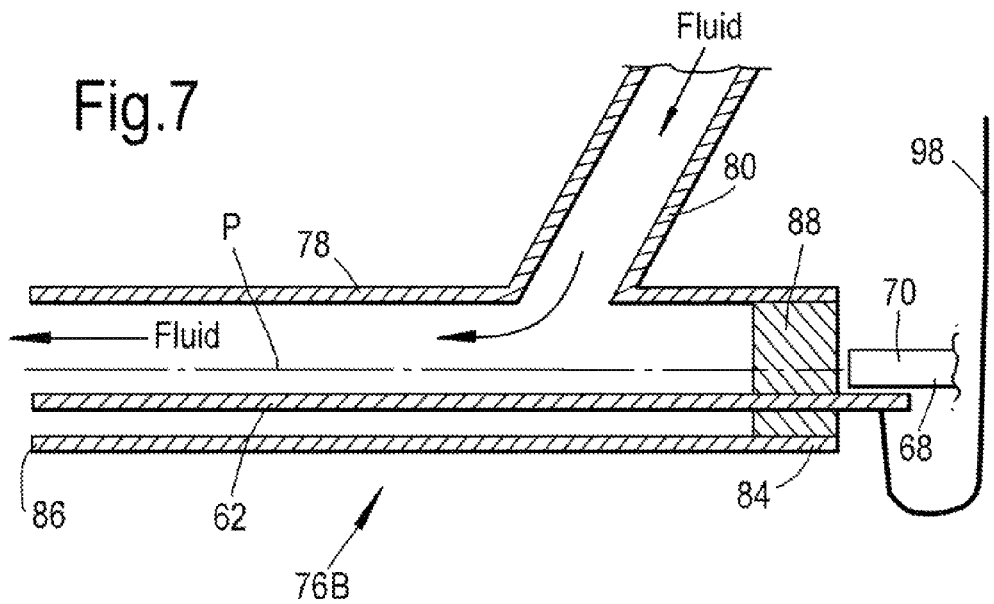

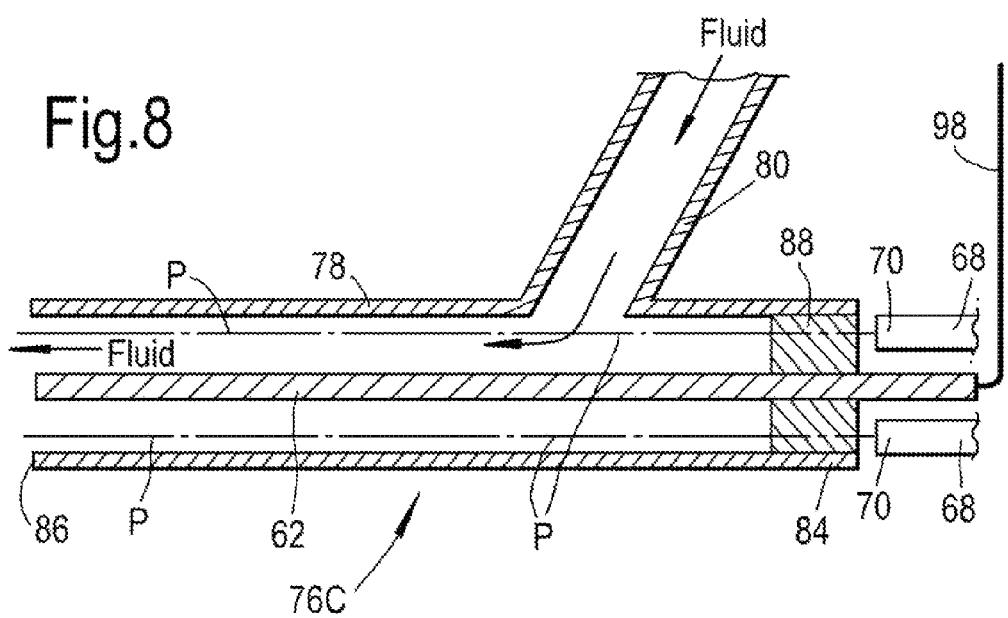
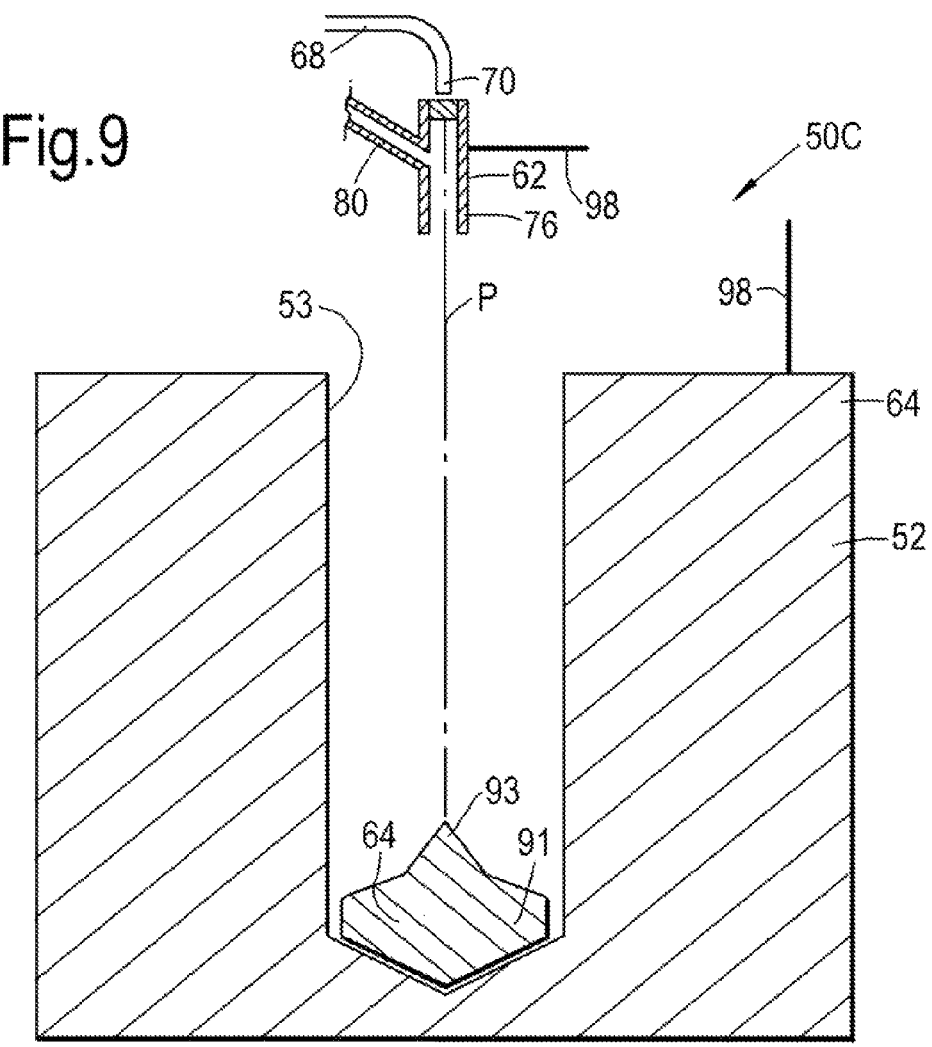

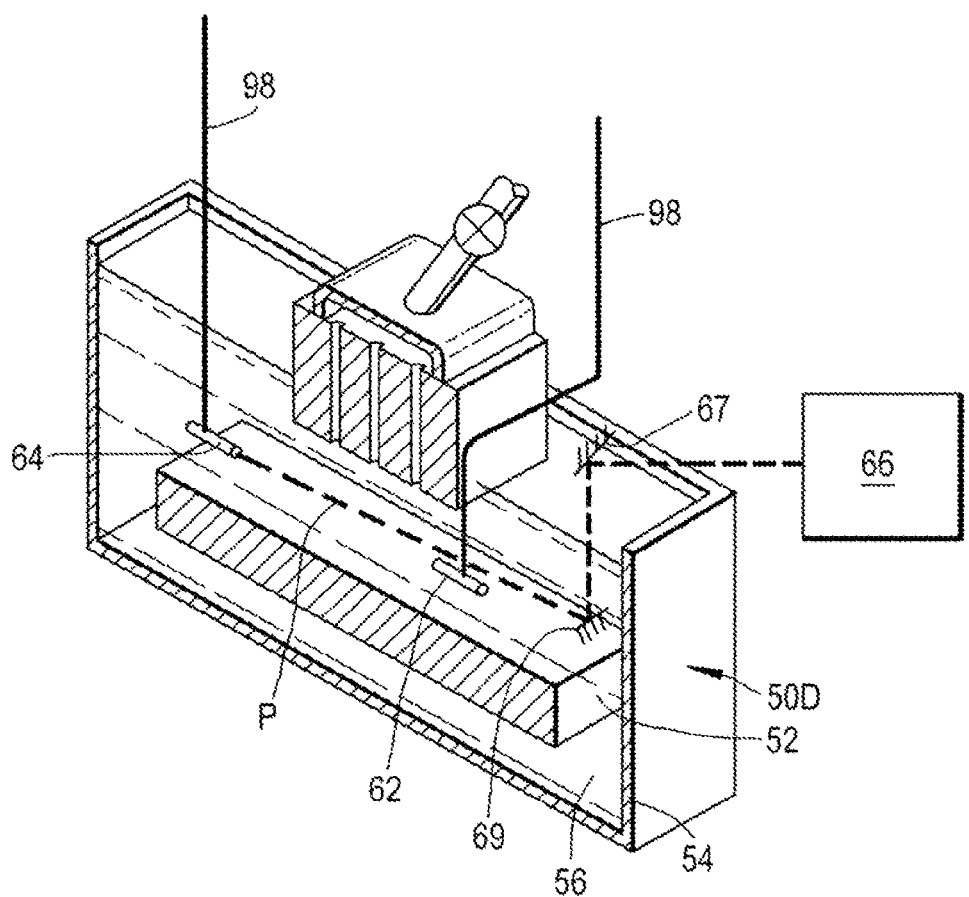

METHOD AND AN APPARATUS FOR PRESTRESSING COMPONENTS BY ELECTRICAL DISCHARGE

The present invention relates to a method and an apparatus for pre-stressing components by electrical discharge and in particular to a method and an apparatus for pre-stressing gas turbine engine components for example rotor blades and stator vanes.

Gas turbine engine components are susceptible to damage caused by ingestion of foreign objects and general fatigue. Such damage may result in stress concentrations and cracks, which limit the lives of the components. This is a particular problem for the leading edges and trailing edges of fan blades, compressor blades, compressor vanes, turbine blades and turbine vanes.

One known solution is to increase the thickness of the aerofoil section at the leading and trailing edges of the blades and/or vanes. However, this adds weight and adversely affects the aerodynamic performance of the blades and vanes, reducing efficiency of the gas turbine engine.

It has been proposed to introduce regions of residual compressive stress into aerofoils, ideally resulting in the entire cross-section of the leading and trailing edges being under compression. By creating such through thickness compression the residual stresses in the leading and trailing edges of the blades and vanes are purely compressive and the tendency for cracks to grow reduced. The stress field is equalised out in the less critical remainder of the blades and vanes.

Our published European patent application EP1191112A1 discloses producing compressive residual stresses in a component using an electrical discharge to produce a pressure pulse in a medium adjacent to the component without the electrical discharge directly contacting the component to produce a region of compressive residual stress in the component.

Our published International patent application WO2008/037949A1 discloses producing compressive residual stresses into a component using an electrically conducting wire and producing an electrical discharge in the electrically conducting wire to cause vapourisation of the electrically conducting wire to produce a pressure pulse in a medium adjacent to the component to produce a region of compressive residual stress in the component.

Our published International patent application WO2008/037948A1 discloses producing compressive residual stress into a component using an electrically conducting sheet and producing an electrical discharge in the electrically conducting sheet to cause vapourisation of the electrically conducting sheet to produce a pressure pulse in a medium adjacent to the component to produce a region of compressive residual stress in the component.

However, the electrically conducting wire and the electrically conducting sheet require an electrically conducting wire, or sheet, and a mechanism to feed the electrically conducting wire, or sheet. In addition the vapourisation of the electrically conducting wire, or sheet, produces discharge products which contaminate the medium adjacent the component. The discharge products are a waste product and have to be removed from the medium.

Accordingly the present invention seeks to provide a novel method of pre-stressing a component, which reduces, preferably overcomes, the above mentioned problem.

Accordingly the present invention provides a method of pre-stressing a component, the method comprising directing a beam of radiation in a path through a medium adjacent to the component between a pair of electrodes to produce a path of reduced electrical resistance through the medium and producing an electrical discharge between the pair of electrodes along at least a portion of the path of reduced electrical resistance through the medium to produce a pressure pulse in the medium adjacent to the component without the electrical discharge directly contacting the component, the pressure pulse impacting a surface of the component to produce a region of compressive residual stress within the component.

The method may comprise directing a second beam of radiation in a second path through the medium adjacent to the component between a second pair of electrodes to produce a second path of reduced electrical resistance through the medium and producing an electrical discharge between the second pair of electrodes along at least a portion of the second path of reduced electrical resistance through the medium to produce a second pressure pulse in the medium adjacent to the component without the electrical discharge directly contacting the component, the second pressure pulse impacting a surface of the component to produce a region of compressive residual stress within the component.

The method may comprise arranging for the pair of electrodes and the second pairs of electrodes to share an electrode.

The method may comprise arranging the first and second pairs of electrodes on opposite sides of the component and simultaneously producing the first electrical discharge and the second electrical discharge such that the first pressure pulse and the second pressure pulse impact opposite surfaces of the component to reduce distortion of the component.

The method may comprise directing a plurality of beams of radiation in paths between the pair of electrodes. The method may comprise directing the plurality of beams of radiation in parallel paths between the pair of electrodes.

The method may comprise directing a plurality of beams of radiation to form a complex shaped path through the medium. The method may comprise directing the plurality of beams of radiation such that they are inclined relative to each other.

Preferably the method comprises directing a laser beam, an x-ray beam or a microwave beam between the pair of electrodes.

Preferably the method comprises supplying laser beam through an optical fibre.

The beam of radiation may produce ionisation in the path between the pair of electrodes or may produce a chemical change in the path between the pair of electrodes.

The method may comprise pre-charging the pair of electrodes to a level below that required to produce an electrical discharge between the pair of electrodes and then directing the beam of radiation in the path between the pair of electrodes to initiate electrical discharge between the pair of electrodes.

The method may comprise directing the beam of radiation in a path through the medium adjacent to the component from a first electrode to a second electrode. The method may comprise producing an electrical discharge between the pair of electrodes along the whole of the path of reduced electrical resistance through the medium from the first electrode to the second electrode.

The method may comprise directing the beam of radiation in a path through the medium adjacent to the component arranged at an angle to a straight line connecting a first electrode to a second electrode.

The method may comprise directing the beam of radiation in a path through the medium adjacent to the component from a third electrode to a fourth electrode. The method may comprise producing an electrical discharge between the pair of electrodes along the whole of the path of reduced electrical resistance through the medium from the third electrode to the fourth electrode.

The method may comprise directing the beam of radiation in a path through the medium adjacent to the component arranged at an angle to a straight line connecting a third electrode to a fourth electrode.

Preferably the component is a gas turbine engine component.

Preferably the component is a rotor blade or a stator vane.

Preferably the rotor blade is a fan blade, a compressor blade or a turbine blade.

The present invention also provides an apparatus for pre-stressing a component, the apparatus comprises means to direct a beam of radiation in a path through a medium adjacent to the component between a pair of electrodes to produce a path of reduced electrical resistance through the medium and means to produce an electrical discharge between the pair of electrodes along at least a portion of the path of reduced electrical resistance through the medium to produce a pressure pulse in the medium adjacent to the component without the electrical discharge directly contacting the component, the pressure pulse impacting a surface of the component to produce a region of compressive residual stress within the component.

The apparatus may comprise means to direct a second beam of radiation in a second path through the medium adjacent to the component between a second pair of electrodes to produce a second path of reduced electrical resistance through the medium and means to produce a second electrical discharge between the second pair of electrodes along at least a portion of the second path of reduced electrical resistance through the medium to produce a second pressure pulse in the medium adjacent to the component without the electrical discharge directly contacting the component, the second pressure pulse impacting a surface of the component to produce a region of compressive residual stress within the component.

The first and second pairs of electrodes may be arranged to share an electrode.

The first and second pairs of electrodes may be arranged on opposite sides of the component and the means to produce the first electrical discharge and the means to produce the second electrical discharge are arranged to discharge simultaneously such that the first pressure pulse and the second pressure pulse impact opposite surfaces of the component to reduce distortion of the component.

Preferably the means to direct a beam of radiation comprises a laser gun, an X-ray source or a microwave source.

Preferably the means to direct a beam of radiation comprises an optical fibre.

The means to direct a beam of radiation may be arranged to direct a plurality of beams of radiation in paths between the pair of electrodes. The means to direct a beam of radiation may be arranged to direct a plurality of beams of radiation in parallel paths between the pair of electrodes.

The means to direct a beam of radiation may be arranged to direct a plurality of beams of radiation to form a complex shaped path between the pair of electrodes. The means to direct a beam of radiation may be arranged to direct the plurality of beams of radiation such that they are inclined relative to each other.

The means to direct a beam of radiation may be arranged to produce an annular beam of radiation and a first electrode of the pair of electrodes is arranged within the annular beam of radiation. The first electrode may be arranged concentrically within the annular beam of radiation.

Alternatively a first electrode of the pair of electrodes is annular and the means to direct a beam of radiation is arranged to direct the beam of radiation through the annular electrode. The means to direct the beam of radiation may be arranged to direct the beam of radiation concentrically through the annular electrode.

The component may form one of the electrodes of the pair of electrodes. One of the electrodes of the pair of electrodes may be electrically connected to the component.

The means to direct a beam of radiation in a path through a medium adjacent to the component may be arranged to direct the beam of radiation from a first electrode to a second electrode.

The means to direct a beam of radiation in a path through a medium adjacent to the component may be arranged to direct the beam of radiation at an angle to a straight line connecting a first electrode to a second electrode.

The means to direct a beam of radiation in a path through a medium adjacent to the component may be arranged to direct the beam of radiation from a third electrode to a fourth electrode.

The means to direct a beam of radiation in a path through a medium adjacent to the component may be arranged to direct the beam of radiation at an angle to a straight line connecting a third electrode to a fourth electrode.

The present invention will be more fully described by way of example with reference to the accompanying drawings in which:

FIG. 4 shows a circuit diagram for the apparatus for pre-stressing a component according to the present invention.

FIG. 5 shows a second embodiment of an apparatus for pre-stressing a component according to the present invention.

FIG. 6 is an enlarged view of a delivery head of the apparatus shown in FIG. 5.

FIG. 7 is an enlarged view of an alternative arrangement of a delivery head of the apparatus shown in FIG. 5.

FIG. 8 is an enlarged view of a different arrangement of a delivery head of the apparatus shown in FIG. 5.

FIG. 9 shows a third embodiment of an apparatus for pre-stressing a component according to the present invention.

FIG. 10 shows a fourth embodiment of an apparatus for pre-stressing a component according to the present invention.

Figure 1:
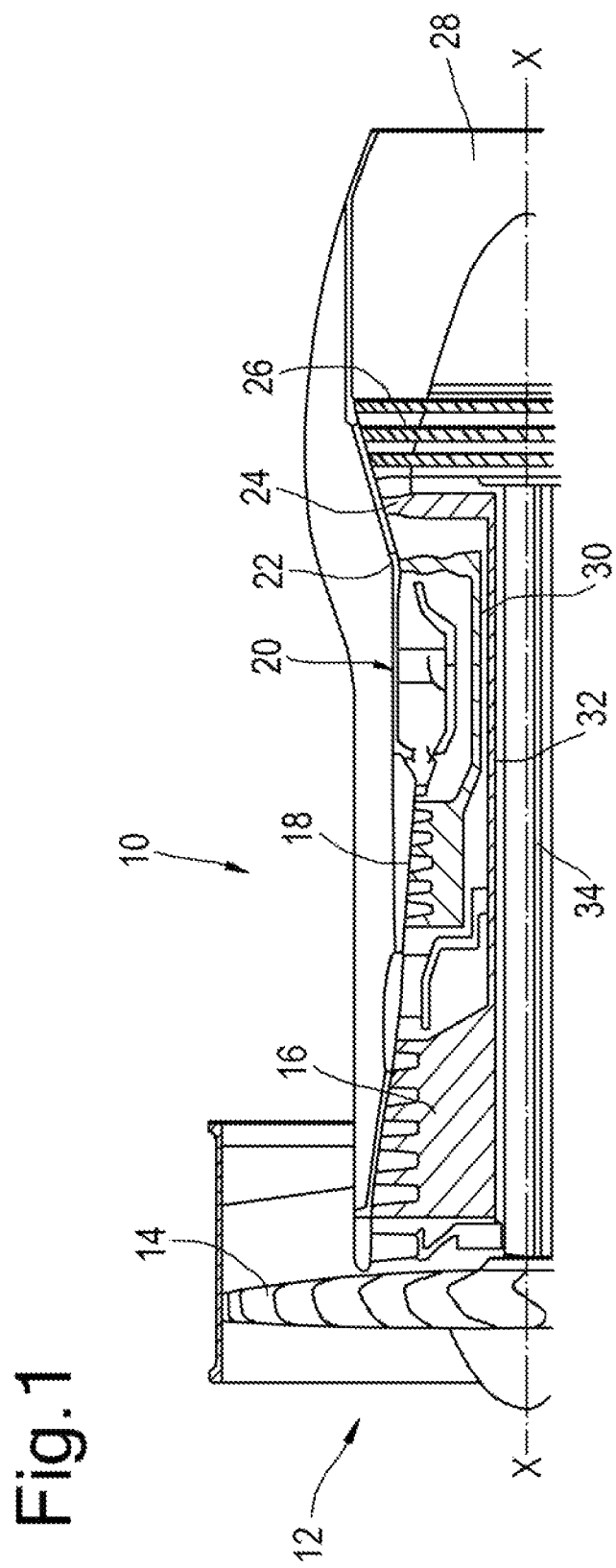
FIG. 1 shows a turbofan gas turbine engine having a rotor blade which has been pre-stressed according to the present invention.

A turbofan gas turbine engine 10, as shown in FIG. 1, comprises in axial flow series an intake 12, a fan 14, an intermediate-pressure compressor 16, a high-pressure compressor 18, combustion equipment 20, a high-pressure turbine 22, an intermediate-pressure turbine 24, a low-pressure turbine 26 and an exhaust 28. The gas turbine engine 10 works in the conventional manner so that air entering the intake 12 is accelerated by the fan 14 to produce two air flows, a first airflow into the intermediate-pressure compressor 16 and a second airflow, which provides propulsive thrust. The intermediate-pressure compressor 16 compresses the airflow and delivers the air to the high-pressure compressor 18 where further compression takes place. The compressed air exhausted from the high-pressure compressor 18 is supplied to the combustion equipment 20 where it is mixed with fuel and the mixture is burnt. The hot gases produced in the combustion equipment 20 are expanded through and thereby drive the high-pressure turbine 22, the intermediate-pressure turbine 24 and the low-pressure turbine 26 before being exhausted through the exhaust 28 to provide additional thrust. The high, intermediate and low-pressure turbines 22, 24 and 26 respectively drive the high and intermediate-pressure compressors 18 and 16 respectively and the fan 14 by shafts 30, 32 and 34 respectively.

Figure 2:
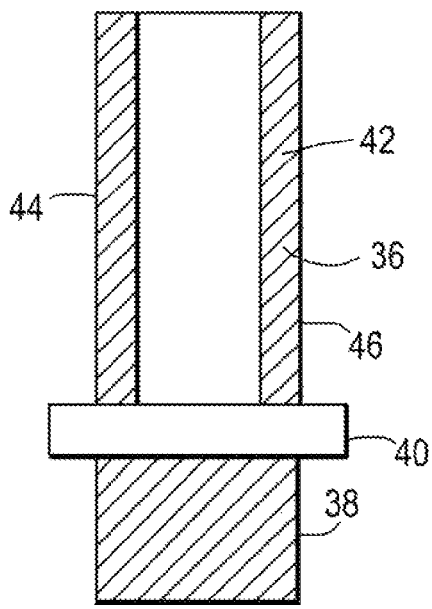
FIG. 2 shows an enlarged view of a rotor blade which has been pre-stressed according to the present invention.

A rotor blade 36 of the gas turbine engine 10, as shown in FIG. 2, comprises a root portion 38, a platform portion 40 and an aerofoil portion 42. The aerofoil portion 42 has a leading edge 44 and a trailing edge 46. The leading edge 44 and the trailing edge 46 of the aerofoil portion 42 and the root portion 38 have been pre-stressed with a compressive residual stress according to the present invention.

Figure 3:
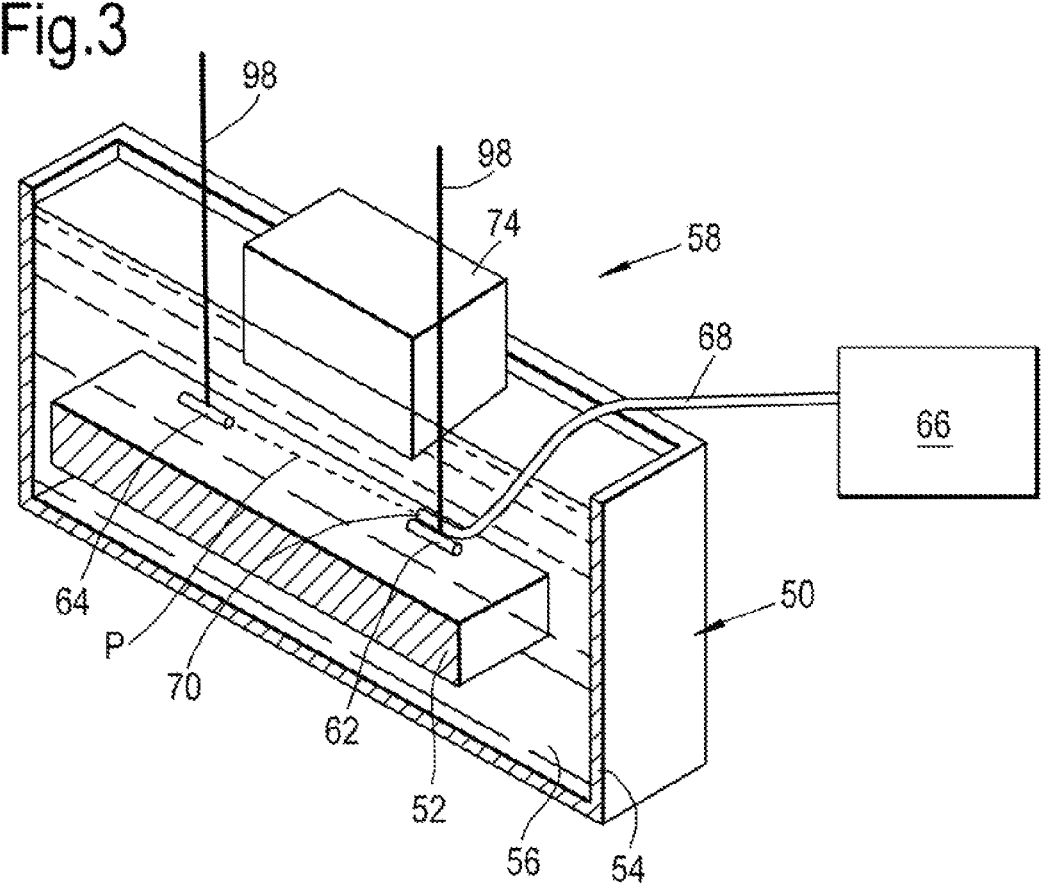
FIG. 3 shows a first embodiment of an apparatus for pre-stressing a component according to the present invention.

A first apparatus 50, as shown in FIGS. 3 and 4, for pre-stressing a component 52 according to the present invention comprises a vessel 54 containing a fluid medium 56, for example water, or oil. An electrical discharge circuit 58, e.g. an electrical pulsed power system, comprises a DC high voltage source 90 which charges an energy storage device 60, such as a high voltage capacitor or a bank of high voltage capacitors, to a level up to about 50 kV through a charging resistor 92, a closing gas-filled switch 94 with a trigger 96, a transmission coaxial cable 98 and a pair of electrodes 62 and 64. The electrodes 62 and 64 are positioned in the fluid medium 56 in the vessel 54 adjacent to the component 52. A laser gun, e.g. a pulsed laser gun, 66 is provided outside of the vessel 54 and an optical fibre cable, optical fibre waveguide, 68 is provided to guide the laser beam from the laser gun 66 into the vessel 54 adjacent to a first electrode 62 of the pair of electrodes 62 and 64. The end 70 of the optical fibre cable 68 remote from the laser gun 66 is positioned adjacent a first electrode 62 and is arranged to direct the laser beam in a path P from the first electrode 62 to a second electrode 64 of the pair of electrodes 62 and 64. When the electrical storage devices 60 are fully charged, the trigger 96 sends a triggering electrical pulse and the switch 94 is closed. After switch 94 is closed, electrical energy accumulated in the energy storage devices 60 transfers to the electrodes 62 and 64 via the coaxial high voltage cable 98. A high voltage appears at the electrodes 62 and 64, which generates a very rapid electrical discharge between the electrodes 62 and 64. The electrical discharge produces a plasma within the fluid medium 56 leading to a shock wave, or a pressure pulse, within the fluid medium 56 which travels through the fluid medium 56 and impacts a surface of the component 52 to produce a region of compressive residual stress within the component 52. A reflector 74 is provided to reflect the pressure pulse towards the component 52.

According to the present invention immediately before the high voltage appears on the electrodes 62 and 64, the laser gun 66 is pulsed to produce a laser beam which travels through the optical fibre cable 68 and is directed along the path P from the end 70 of the optical fibre cable 68, adjacent to the first electrode 62, through the fluid medium 56 from the first electrode 62 to the second electrode 64. The passage of the laser beam through the fluid medium 56 ionises the fluid medium 56 in the immediate vicinity of the path P of the laser beam through the fluid medium 56. This ionised path P through the fluid medium 56 forms a path of reduced electrical resistance for the subsequent electrical discharge between the electrodes 62 and 64.

A second apparatus 50B, as shown in FIGS. 5 and 6, for pre-stressing a component 52 according to the present invention, is similar to that shown in FIGS. 3 and 4 and like parts are denoted by like numerals. The second apparatus 50B includes a delivery head 76, which is shown more clearly in FIG. 6. The delivery head 76 is positioned within the fluid medium 56 within the vessel 54 adjacent the component 52. The delivery head 76 comprises a hollow tubular member 78, which has a first end 84 and a second end 86. The first end 84 of the tubular member 78 is closed and the second end 86 of the tubular member 78 is open. A supply pipe 80 is connected to the tubular member 78 between the first and second ends 84 and 86 and is arranged to supply fluid medium into the tubular member 78 via a valve 82 and the fluid medium flows through the tubular member 78 and is discharged from the second end 86 into the fluid medium 56 within the vessel 54. The first end 84 of the tubular member 78 is closed by an optical window 88 and the end 70 of the optical fibre cable 68 is positioned outside the tubular member 78. The end 70 of the optical fibre cable 68 is arranged to direct the laser beam along the path P through the optical window 88 at the first end 84 of the tubular member 78 through the tubular member 78 and out of the second end 86 of the tubular member 78 and towards the second electrode 64. The tubular member 78 is electrically conducting and forms the first electrode 62, and thus in this example the first electrode 62 is annular, and is arranged around the path P of the laser beam emitted by the end 70 of the optical fibre cable 68. The tubular member 78 is electrically isolated from the pipe 80 by a ring of insulation 89. The fluid medium supplied into the tubular member 78 provides a continuous flow of fluid medium through and out of the tubular member 78, which helps to keep the optical window 88 clean and provides a continuous flow of fluid medium towards the second electrode 64 which prevents discharges between the electrodes 62 and 64 other than the path P of the laser beam.

An alternative delivery head 76B for use in FIG. 5 is shown in FIG. 7. The delivery head 76B is positioned within the fluid medium 56 within the vessel 54 adjacent the component 52. The delivery head 76B comprises a hollow tubular member 78, which has a first end 84 and a second end 86. The first end 84 of the tubular member 78 is closed and the second end 86 of the tubular member 78 is open. A supply pipe 80 is connected to the tubular member 78 between the first and second ends 84 and 86 and is arranged to supply fluid medium into the tubular member 78 via a valve 82 and the fluid medium flows through the tubular member 78 and is discharged from the second end 86 into the fluid medium 56 within the vessel 54. The first end 84 of the tubular member 78 is closed by an optical window 88 and the end 70 of the optical fibre cable 68 is positioned outside the tubular member 78. The end 70 of the optical fibre cable 68 is arranged to direct the laser beam along the path P through the optical window 88 at the first end 84 of the tubular member 78 through the tubular member 78 and out of the second end 86 of the tubular member 78 and towards the second electrode 64. A separate first electrode 62 is positioned within the tubular member 78 and extends from the first end 84 towards the second end 86 of the tubular member 78. The first electrode 62 extends through and is supported by the optical window 88 and is electrically isolated from the tubular member 78 by the optical window 88. The first electrode 62 is arranged adjacent to the path P of the laser beam emitted by the end 70 of the optical fibre cable 68. The fluid medium supplied into the tubular member 78 provides a continuous flow of fluid medium through and out of the tubular member 78, which helps to keep the optical window 88 clean and provides a continuous flow of fluid medium towards the second electrode 64 which prevents discharges between the electrodes 62 and 64 other than the path P of the laser beam.

A further alternative delivery head 76C for use in FIG. 5 is shown in FIG. 8. The delivery head 76C is positioned within the fluid medium 56 within the vessel 54 adjacent the component 52. The delivery head 76C comprises a hollow tubular member 78, which has a first end 84 and a second end 86. The first end 84 of the tubular member 78 is closed and the second end 86 of the tubular member 78 is open. A supply pipe 80 is connected to the tubular member 78 between the first and second ends 84 and 86 and is arranged to supply fluid medium into the tubular member 78 via a valve 82 and the fluid medium flows through the tubular member 78 and is discharged from the second end 86 into the fluid medium 56 within the vessel 54. The first end 84 of the tubular member 78 is closed by an optical window 88 and the end 70 of the optical fibre cable 68 is positioned outside the tubular member 78. The end 70 of the optical fibre cable 68 is arranged to direct the laser beam along the path P through the optical window 88 at the first end 84 of the tubular member 78 through the tubular member 78 and out of the second end 86 of the tubular member 78 and towards the second electrode 64. Either an annular optical fibre 68 or a plurality of circumferentially arranged optical fibres 68 are arranged to produce an annular laser beam and thus an annular path P. A separate first electrode 62 is positioned within the tubular member 78 and extends from the first end 84 towards the second end 86 of the tubular member 78. The first electrode 62 extends through and is supported by the optical window 88 and is electrically isolated from the tubular member 78 by the optical window 88. The first electrode 62 is arranged coaxially within the tubular member 78 and coaxially within the annular path P of the laser beam emitted by the end 70 of the optical fibre cable 68 or ends 70 of the optical fibre cables 68. The fluid medium supplied into the tubular member 78 provides a continuous flow of fluid medium through and out of the tubular member 78, which helps to keep the optical window 88 clean and provides a continuous flow of fluid medium towards the second electrode 64 which prevents discharges between the electrodes 62 and 64 other than the path P of the laser beam.

A third apparatus 50C, as shown in FIG. 9, for pre-stressing a component 52 according to the present invention, is similar to that shown in FIGS. 3 and 4 and like parts are denoted by like numerals. The third apparatus 50C is for pre-stressing the internal surfaces of a bore, or a hole, 53 within a component 52. In the third apparatus 50C the axis of the tubular member 78 of the delivery head 76 is aligned, coaxially, with the bore 53 in the component 52 and thus the path P of the laser beam is aligned, coaxially, with the bore 53 in the component 52. The component 52 is electrically connected to the cable 98 such that the component 52 forms a first portion of the second electrode 64. A circular member 91 is positioned within and rests on the bottom of the bore 53 and the circular member 91 tapers about its axis to a point 93. The circular member 91 forms a second portion of the second electrode 64 by virtue of contact with the component 52. The laser beam and the electrical discharge are arranged to intersect the point 93 of the circular member 91 and the electrical discharge is dissipated, or spread, through the circular member 91 to prevent damage to the component 52. Alternatively, a point may be machined into the component 52 at the bottom of the bore 53.

A fourth apparatus 50D, as shown in FIG. 10, for pre-stressing a component 52 according to the present invention, is similar to that shown in FIGS. 3 and 4 and like parts are denoted by like numerals. In this arrangement the laser beam from the laser gun 66 is directed to produce the path P between the electrodes 62 and 64 by mirrors 67 and 69 rather than using an optical fibre cable. In addition the reflector 74 is porous or has a number of passages 75 extending therethrough. A pipe 77 and a valve 79 control the flow of fluid medium to a manifold 81 defined at least partially by the reflector 74. The fluid medium is allowed to flow from the manifold 81 through the passages 75 and over the component 52. The passages 75 may be holes or slots etc.

Figure 11:
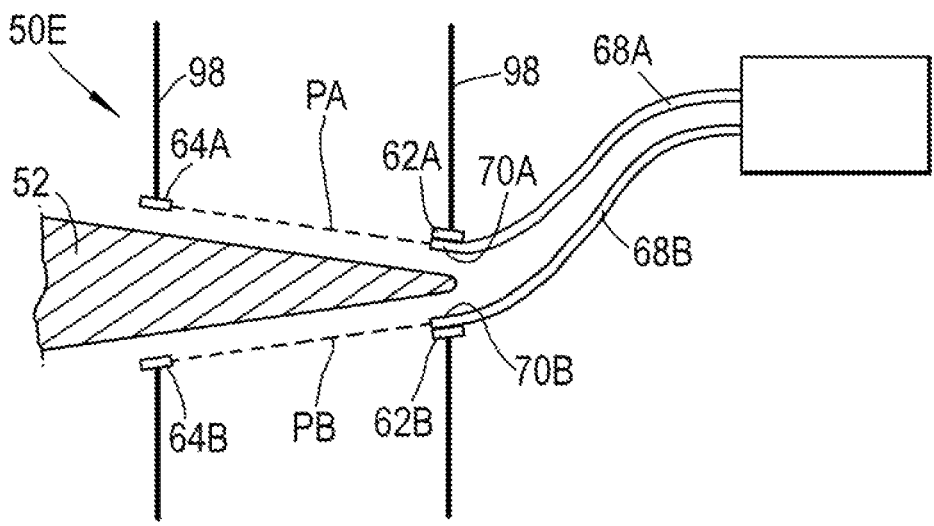
FIG. 11 shows a fifth embodiment of an apparatus for pre-stressing a component according to the present invention.

A fifth apparatus 50E, as shown in FIG. 11, for pre-stressing a component 52 according to the present invention, is similar to that shown in FIGS. 3 and 4 and like arts are denoted by like numerals. In this arrangement the fifth apparatus 50E is arranged to simultaneously pre-stress both sides of a component 52, to prevent, or reduce, bending of the component 52. The fifth apparatus 50E is particularly useful for pre-stressing the leading edge and/or the trailing edge of an aerofoil portion of a rotor blade of a gas turbine engine. The fifth apparatus 50E produces two electrical discharges simultaneously, but the electrical discharges are on opposite sides of the component, e.g. a leading edge of an aerofoil portion of a rotor blade, 52. The laser gun, e.g. a pulsed laser gun, 66 is provided outside of the vessel and two optical fibre cables, optical fibre waveguides, 68A and 68B are provided to guide two laser beams from the laser gun 66 into the vessel adjacent to respective first electrodes 62 of two pairs of electrodes 62A and 64A and 62B and 64B. The ends 70A, 70B of the optical fibre cables 68A, 68B remote from the laser gun 66 are positioned adjacent the respective first electrode 62A, 62B and are arranged to direct the laser beam in respective paths PA and PB to respective second electrodes 64A, 64B of the two pairs of electrodes 62A and 64A and 62B and 64B. The vessel and medium is not shown in FIG. 11.

It is equally possible to use mirrors instead of the optical fibre cable in the embodiments in FIG. 3 and FIGS. 5 to 9 and 11 to direct the laser beam between the electrodes. It is equally to use the porous backing member in FIG. 10 in the embodiments in FIGS. 3 and 5. It is possible to use an optical fibre cable in the embodiment in FIG. 10 in place of the mirrors to direct the laser beam between the electrodes.

In one method of operating the apparatuses in the present invention the electrodes 62, 64 are pre-charged to level below that required to produce an electrical discharge there-between. Then the laser gun 66 is fired so that the laser beam P is directed along the path between the electrodes 62, 64 to produce ionisation to reduce the effective electrical resistance and to allow an electrical discharge between the electrodes 62, 64. This produces improved electrical discharge timing and may produce better pulse characteristics, i.e. rise time and pulse duration. If this method is used in the apparatus in FIG. 11, it produces better synchronisation of the electrical discharges on the opposite sides of the component 52.

Simultaneous or phased firing of the laser gun and the electrical discharge may also be achieved by using a remote laser operated high voltage switch instead of the switch 94 in FIG. 4. The trigger 96 is replaced by an output from the laser gun. This provides a simpler and improved control of the laser gun and electrical pulse timing.

Figure 12:
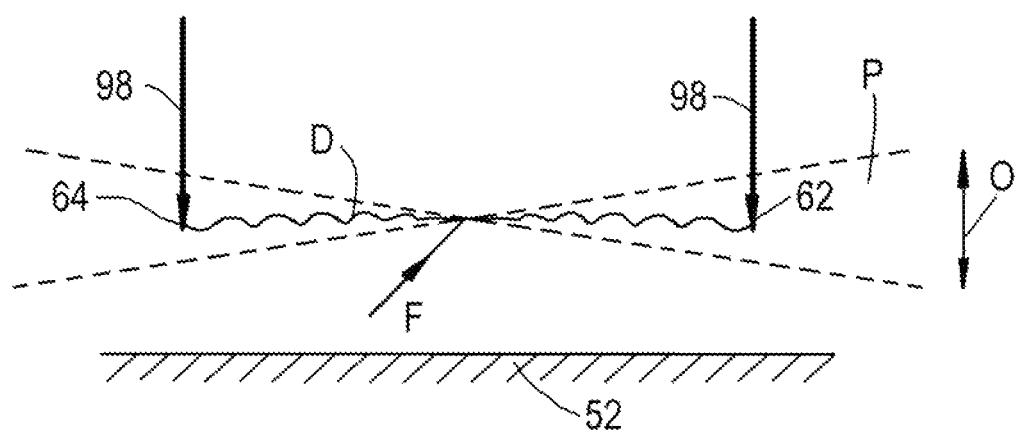
FIG. 12 shows an arrangement in which the point of maximum focus of the laser beam is midway between the pair of electrodes.
Figure 13:
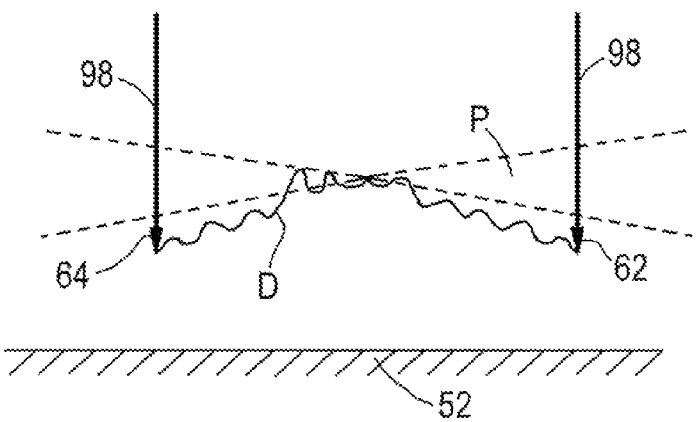
FIG. 13 shows another arrangement in which the point of maximum focus of the laser beam is midway between the pair of electrodes.

The laser beam will tend to have the most effect at a point of maximum focus of the laser beam. FIGS. 12 and 13 show a point F of maximum focus of the laser beam P arranged to be half way between the first electrode 62 and the second electrode 64. This may control the direction of the discharge D such that it is away from the component 52. There may be an optical system O to focus the laser beam to a point F of maximum focus.

Figure 14:
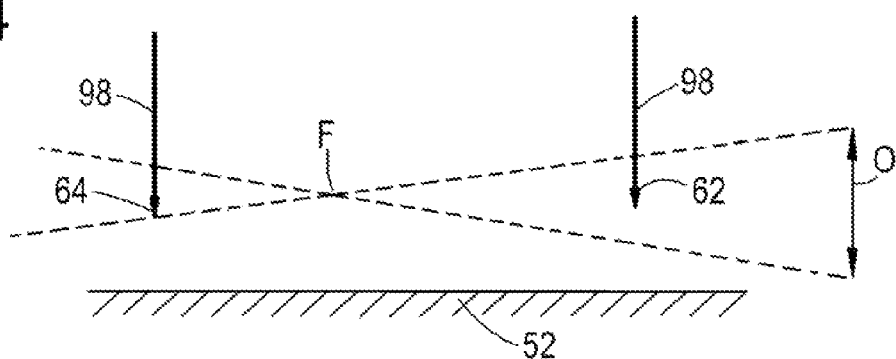
FIG. 14 shows an arrangement in which the point of maximum focus of the laser beam is biased towards one of the electrodes.

Alternatively, as shown in FIG. 14 the point F of maximum focus of the laser beam may be biased towards, e.g. may be arranged to be closer to, the second electrode 64 which is further from the laser gun 66 than the first electrode 62 in order to compensate for attenuation of the laser beam P as it passes through the medium 56. The exact laser beam and electrode geometry is determined by the laser light frequency and its propagation properties through the particular medium. The biasing of the point F of maximum focus of the laser beam towards one of the electrodes, especially the negative electrode, is expected to help initiation of the electrical discharge through the medium 56 between the pair of electrodes 62 and 64.

Figure 15:
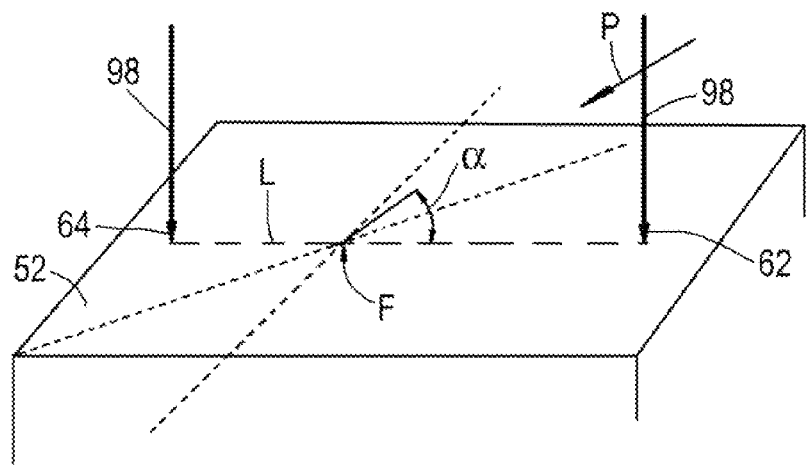
FIG. 15 shows a sixth embodiment of an apparatus for pre-stressing a component according to the present invention.

The path P of the laser beam may be arranged at an angle α to a straight line L joining the first and second electrodes 62 and 64, as shown in FIG. 15. This may be used to bias the discharge in a direction away from the component 52 in order to reduce the tendency for the discharge to interact with the component 52.

The advantage of the present invention is that it does not require a consumable electrically conducting wire or a consumable electrically conducting sheet and it does not require a mechanism to feed the electrically conducting wire, or sheet. In addition no waste products are produced to contaminate the medium adjacent the component and it does not require mechanism to remove waste products from the medium. Also, the present invention is less complex than the prior art, is lower cost, is rapid in operation and provides good access to components with complex shapes.

Although the present invention has been described with reference to the use of a laser beam to produce ionisation in a path through the medium, to produce a path of reduced electrical resistance through the medium, it is equally possible to use other types of radiation from the electromagnetic spectrum, for example a collimated beam of x-rays, gamma rays or microwaves, to produce ionisation in the path through the medium. The laser beam, or other type of radiation beam, may produce a chemical change or burning, which produces a path of reduced electrical resistance through the medium. The radiation beam may be a narrow beam of radiation or a sheet of radiation.

Generally the present invention has described a radiation beam directed in a straight line path through the medium to produce a straight line path of reduced electrical resistance through the medium from a first electrode to a second electrode it is equally possible to provide a plurality of radiation beams to form a complex shaped path through the medium and each of the radiation beams is directed in a straight line. A complex shaped path is not a straight line path. The plurality of radiation beams may be arranged such that they are inclined relative to each other to form the complex shaped path through the medium and thus the plurality of radiation beams are arranged sequentially to form the complex shaped path through the medium. Thus each of the radiation beams forms a portion of the complex shaped path through the medium.

Although the present invention has been described with reference to producing an electrical discharge between a pair of electrodes, it may also be possible to produce an electrical discharge from a first electrode to a plurality of second electrodes and provide a respective ionised path between the first electrode and the respective one of the plurality of second electrodes. It may also be possible to produce a plurality of electrical discharges between a plurality of pairs of electrodes and provide an ionised path between each of the pairs of electrodes.

The present invention may comprise directing the beam of radiation in a path through the medium adjacent to the component from a first electrode to a second electrode or the present invention may comprise directing the beam of radiation in a path through the medium adjacent to the component arranged at an angle to a straight line connecting a third electrode to a fourth electrode.

The present invention may comprise producing an electrical discharge between the pair of electrodes along at least a portion of the path of reduced electrical resistance through the medium from the first electrode to the second electrode and the present invention may comprise producing an electrical discharge between the pair of electrodes along the whole of the path of reduced electrical resistance through the medium from the first electrode to the second electrode.

The invention claimed is:

1. A method of pre-stressing a component, the method comprising:
   directing a beam of radiation in a path through a medium adjacent to the component between a pair of electrodes to produce a path of reduced electrical resistance through the medium; and
   producing an electrical discharge between the pair of electrodes along at least a portion of the path of reduced electrical resistance through the medium to produce a pressure pulse in the medium adjacent to the component without the electrical discharge directly contacting the component, the pressure pulse impacting a surface of the component to produce a region of compressive residual stress within the component,
   wherein the beam directed in the path between the pair of electrodes is selected from the group consisting of a laser beam, an x-ray beam, a microwave beam and a gamma ray beam.

2. The method according to claim 1, further comprising:
   directing a second beam of radiation in a second path through the medium adjacent to the component between a second pair of electrodes to produce a second path of reduced electrical resistance through the medium; and
   producing a second electrical discharge between the second pair of electrodes along at least a portion of the second path of reduced electrical resistance through the medium to produce a second pressure pulse in the medium adjacent to the component without the electrical discharge directly contacting the component, the second pressure pulse impacting a surface of the component to produce a region of compressive residual stress within the component.

3. The method according to claim 2, further comprising:
   arranging for the first and second pairs of electrodes to share an electrode.

4. The method according to claim 2, further comprising:
   arranging the first and second pairs of electrodes on opposite sides of the component; and
   simultaneously producing the first electrical discharge and the second electrical discharge such that the first pressure pulse and the second pressure pulse impact opposite surfaces of the component to reduce distortion of the component.

5. The method according to claim 1, further comprising:
   directing a plurality of beams of radiation in paths between the pair of electrodes.

6. The method according to a claim 5, further comprising:
directing the plurality of beams of radiation in parallel paths between the pair of electrodes.

7. The method according to claim 1, further comprising:
directing a plurality of beams of radiation to form a complex shaped path through the medium, the complex shaped path through the medium being non-linear.

8. The method according to claim 7, further comprising:
directing the plurality of beams of radiation such that they are inclined relative to each other.

9. The method according to claim 1, further comprising:
supplying the laser beam through an optical fibre.

10. The method according to claim 1, wherein the beam of radiation produces ionisation in the path between the pair of electrodes.

11. The method according to claim 1, further comprising:
pre-charging the pair of electrodes to a level below that required to produce an electrical discharge between the pair of electrodes and then directing the beam of radiation in the path between the pair of electrodes to initiate electrical discharge between the pair of electrodes.

12. The method according to claim 1, further comprising:
directing the beam of radiation in a path through the medium adjacent to the component from a first electrode to a second electrode.

13. The method according to claim 1, further comprising:
directing the beam of radiation in a path through the medium arranged at an angle to a straight line connecting a first electrode to a second electrode.

14. The method according to claim 1, wherein the component is a gas turbine engine component.

15. The method according to claim 14, wherein the component is selected from the group consisting of a rotor blade and a stator vane.

16. The method according to claim 15, wherein the rotor blade is selected from the group consisting of a fan blade, a compressor blade and a turbine blade.

17. An apparatus for pre-stressing a component, the apparatus comprising:
means to direct a beam of radiation in a path through a medium adjacent to the component between a pair of electrodes to produce a path of reduced electrical resistance through the medium; and
means to produce an electrical discharge between the pair of electrodes along at least a portion of the path of reduced electrical resistance through the medium to produce a pressure pulse in the medium adjacent to the component without the electrical discharge directly contacting the component, the pressure pulse impacting a surface of the component to produce a region of compressive residual stress within the component,
wherein the means to direct a beam of radiation is selected from the group consisting of a laser gun, an X-ray source, a microwave source and a gamma ray source.

18. The apparatus according to claim 17, further comprising:
means to direct a second beam of radiation in a second path through the medium adjacent to the component between a second pair of electrodes to produce a second path of reduced electrical resistance through the medium; and
means to produce a second electrical discharge between the second pair of electrodes along at least a portion of the second path of reduced electrical resistance through the medium to produce a second pressure pulse in the medium adjacent to the component without the electrical discharge directly contacting the component, the second pressure pulse impacting a surface of the component to produce a region of compressive residual stress within the component.

19. The apparatus according to claim 18, wherein the first and second pairs of electrodes are arranged to share an electrode.

20. The apparatus according to claim 17, wherein the first and second pairs of electrodes are arranged on opposite sides of the component and the means to produce the first electrical discharge and the means to produce the second electrical discharge are arranged to discharge simultaneously such that the first pressure pulse and the second pressure pulse impact opposite surfaces of the component to reduce distortion of the component.

21. The apparatus according to claim 17, wherein the means to direct a beam of radiation is arranged to direct a plurality of beams of radiation in paths between the pair of electrodes.

22. The apparatus according to claim 21, wherein the means to direct a beam of radiation is be arranged to direct a plurality of beams of radiation in parallel paths between the pair of electrodes.

23. The apparatus as claimed in claim 17, wherein the means to direct a beam of radiation is arranged to produce an annular beam of radiation and a first electrode of the pair of electrodes is arranged within the annular beam of radiation.

24. The apparatus according to claim 23, wherein
a tubular member has a first closed end and a second open end, the first closed end comprising an optical window, and
an end of an optical fibre is arranged outside the tubular member, the optical fibre being arranged to direct the beam through the optical window and the tubular member, and out of the second open end of the tubular member, and the first electrode being arranged within the tubular member.

25. The apparatus according to claim 17, wherein a first electrode of the pair of electrodes is annular and the means to direct a beam of radiation is arranged to direct the beam of radiation through the annular electrode.

26. The apparatus according to claim 25, wherein
the annular electrode has a first closed end and a second open end, the first closed end comprising an optical window, and
an end of an optical fibre is arranged outside the annular electrode, the optical fibre being arranged to direct the beam through the optical window and the annular electrode, and out of the second open end of the annular electrode.

27. The apparatus according to claim 17, wherein the means to direct a beam of radiation comprises an optical fibre.

28. The apparatus according to claim 17, wherein the component forms one of the electrodes of the pair of electrodes.

29. The apparatus according to claim 17, wherein one of the electrodes of the pair of electrodes is electrically connected to the component.

30. The apparatus according to claim 17, wherein the means to direct a beam of radiation in a path through a medium adjacent to the component is arranged to direct the beam of radiation from a first electrode to a second electrode.

31. The apparatus according to claim 17, wherein the means to direct a beam of radiation in a path through a medium adjacent to the component is arranged to direct the beam of radiation at an angle to a straight line connecting a first electrode to a second electrode.

32. An apparatus for pre-stressing a component, the apparatus comprising:
- a laser gun that directs a beam of radiation in a path through a medium adjacent to the component between a pair of electrodes to produce a path of reduced electrical resistance through the medium; and
- a circuit that produces an electrical discharge between the pair of electrodes along at least a portion of the path of reduced electrical resistance through the medium to produce a pressure pulse in the medium adjacent to the component without the electrical discharge directly contacting the component, the pressure pulse impacting a surface of the component to produce a region of compressive residual stress within the component.

* * * * *